US 12,059,856 B2

(12) United States Patent
Rabiega et al.

(10) Patent No.: US 12,059,856 B2
(45) Date of Patent: Aug. 13, 2024

(54) METHODS AND SYSTEMS FOR FORMING A SHIMMED ASSEMBLY

(71) Applicant: The Boeing Company, Chicago, IL (US)

(72) Inventors: Marcin A. Rabiega, Everett, WA (US); Kevin L Braun, Seattle, WA (US); Jason R. Grindon, Mukilteo, WA (US); Yaniv R. Rock, Seattle, WA (US); John C. Osborne, Seattle, WA (US)

(73) Assignee: The Boeing Company, Arlington, VA (US)

( * ) Notice: Subject to any disclaimer, the term of this patent is extended or adjusted under 35 U.S.C. 154(b) by 3 days.

(21) Appl. No.: 17/578,638

(22) Filed: Jan. 19, 2022

(65) Prior Publication Data

US 2022/0234314 A1 Jul. 28, 2022

Related U.S. Application Data

(60) Provisional application No. 63/142,845, filed on Jan. 28, 2021.

(51) Int. Cl.
*B29C 70/68* (2006.01)
*B33Y 10/00* (2015.01)
(Continued)

(52) U.S. Cl.
CPC ............ *B29C 70/682* (2013.01); *B33Y 10/00* (2014.12); *B33Y 30/00* (2014.12); *B33Y 80/00* (2014.12);
(Continued)

(58) Field of Classification Search
CPC ........ B29C 70/682; B29C 64/386–393; B29C 70/681; B29C 70/683; B29C 70/685; B33Y 10/00; B33Y 30/00; B33Y 80/00
See application file for complete search history.

(56) References Cited

U.S. PATENT DOCUMENTS

| 11,597,153 B1* | 3/2023 | Barbati | B29C 64/118 |
| 2015/0099096 A1* | 4/2015 | Forston | B32B 7/06 156/244.11 |
| 2015/0165746 A1* | 6/2015 | Prebil | B29C 65/5057 156/308.2 |

(Continued)

FOREIGN PATENT DOCUMENTS

EP 2933742 A1 10/2015

OTHER PUBLICATIONS

Gardiner, The future of CFRP aerostructures assembly, CompositesWorld, May 1, 2018 (accessed May 19, 2023), https://www.compositesworld.com/articles/the-future-of-cfrp-aerostructures-assembly (Year: 2018).*

(Continued)

*Primary Examiner* — Philip C Tucker
*Assistant Examiner* — Andrew L Swanson
(74) *Attorney, Agent, or Firm* — McDonnell Boehnen Hulbert & Berghoff LLP

(57) ABSTRACT

In an example, a method of shimming an uncured substructure for assembly is disclosed. The method comprises emitting a signal from an inspection system proximate a mating surface of the substructure, detecting a reflection of the signal with the inspection system, generating a data set based on detecting the reflection of the signal, the data set representing a shape of the mating surface, determining distances between a plurality of points on the mating surface and respective points on an inner surface of a support structure based on the data set, generating filler dimension data based on the distances, wherein the filler dimension data includes a varying thickness, shaping a filler structure with a computer numerical controlled shaping device using the filler dimension data, adhering a first surface of the filler structure to the mating surface of the substructure to form a shimmed substructure subassembly, and curing the shimmed substructure subassembly.

20 Claims, 7 Drawing Sheets

(51) Int. Cl.
    *B33Y 30/00*         (2015.01)
    *B33Y 80/00*         (2015.01)
    *B29C 64/386*       (2017.01)
    *B29C 64/393*       (2017.01)
    *B29L 31/30*         (2006.01)
    *B33Y 50/00*         (2015.01)
    *B33Y 50/02*         (2015.01)

(52) U.S. Cl.
    CPC .......... *B29C 64/386* (2017.08); *B29C 64/393* (2017.08); *B29L 2031/3082* (2013.01); *B33Y 50/00* (2014.12); *B33Y 50/02* (2014.12)

(56) References Cited

U.S. PATENT DOCUMENTS

2017/0138385 A1*   5/2017   Clark ...................... G06F 30/15
2018/0067476 A1*   3/2018   Engelbart ............... G06F 30/17
2019/0329496 A1*   10/2019   Vasa ..................... B29C 64/386

OTHER PUBLICATIONS

Ginger Gardiner, "The future of CFRP aerostructures assembly", Jan. 5, 2018, retrieved on Jun. 9, 2022 from the Internet: URL:https://www.compositesworld.com/articles/the-future-of-cfrp-aerostrucures-assembly.

Fraunhofer Ifam, Science transparent: Automated vertical tail plane assembly, Oct. 11, 2016, retrieved on Jun. 9, 2022 from the Internet: URL:https://www.youtub.com/watch?b=pTGdiNMJj4Y.

J Jamshidi et al., "Manufacturing and assembly automation by integrated metrology systems for aircraft wing fabrication", Institution of Mechanical Engineers. Proceedings. Journal of Engineering Manufacture., vol. 224, No. 1, Jul. 9, 2009, pp. 25-36.

Ismet Baran et al., "A Review of the mechanical modeling composite manufacturing processes", Archives of Computational Methods in Engineering, Springer Netherelands, Dordrecht, vol. 24, No. 2, Jan. 2, 2006, pp. 365-395.

Extended European Search Report prepared by the European Patent Office in application No. EP 22 15 3489. dated Jun. 21, 2022.

* cited by examiner

METHODS AND SYSTEMS FOR FORMING A SHIMMED ASSEMBLY

CROSS-REFERENCE TO RELATED APPLICATIONS

The present disclosure claims priority to U.S. Provisional Application No. 63/142,845, filed on Jan. 28, 2021, the entire contents of which are herein incorporated by reference.

FIELD

The present disclosure relates generally to a method of joining structures, and more particularly, to a method and system for manufacturing and mounting a filler or shim.

BACKGROUND

Parts may be manufactured for assembly from composite materials such as fiber glass or carbon fiber. Composite parts can be formed as a laminate comprising multiple layers of fiber material and resin. The composite parts can then be connected to other structures, such as support structure formed of composite materials or metallic materials.

Gaps between the composite material and the supporting structure can reduce the contact area and therefore reduce the strength of the interface between the composite part and the supporting structure. Bridging of gaps with adhesive can strain the composite joint, resulting in component damage (i.e. delamination) or reduced joint strength of the assembly therein.

Existing methods of assembling parts include inserting a filler or shim between the composite part and the supporting structure. The filler or shim is shaped to substantially follow the mounting surface of the composite part. Shaping the filler or shim is an iterative process that involves mounting a filler to the composite part, inspecting the assembly, noting gaps between the filler and the composite part, and adjusting the filler through subtractive or additive manufacturing. The inspection of the assembly can be destructive to the filler and/or the composite part, requiring replacements for the iterative process.

As such, there is a desire for an improved method and system for assembling parts using a shim or filler.

SUMMARY

In an example, a method of shimming an uncured substructure for assembly is described. The method comprises emitting a signal from an inspection system proximate a mating surface of the substructure, detecting a reflection of the signal with the inspection system, generating a data set based on detecting the reflection of the signal, the data set representing a shape of the mating surface, determining distances between a plurality of points on the mating surface and respective points on an inner surface of a support structure based on the data set, generating filler dimension data based on the distances, wherein the filler dimension data includes a varying thickness, shaping a filler structure with a computer numerical controlled shaping device using the filler dimension data, adhering a first surface of the filler structure to the mating surface of the substructure to form a shimmed substructure subassembly, and curing the shimmed substructure subassembly.

In another example, a method manufacturing and mounting a shim is described. The method comprises forming a substructure at least partially composed of an uncured resin material, nondestructively inspecting a mating surface of the substructure using a scanning device, generating with the scanning device a data set representing a shape of the mating surface, calculating a topographical surface map of a first surface of the shim based on the data set, manufacturing the shim with a computer numerical controlled manufacturing device, the shim having a first surface shaped based on the topographical surface map, applying the shim to the substructure such that the first surface engages the mating surface to form a subassembly, and curing the subassembly.

In another example, a system for manufacturing a shim for use in mating a support structure to a substructure is described. The system comprises an inspection system comprising an emitter and a detector wherein the inspection system is configured to inspect a mating surface of the substructure and generate a data set representing a shape of the mating surface. The system further comprises a computing device configured to model a first surface of the shim based on the data representing the mating surface and generate model data representing the first surface, a computer numerical control manufacturing device having a controller and a shaping structure, wherein the manufacturing device is configured to manufacture a shim having a surface shaped using the model data, and an autoclave configured to cure a subassembly including the shim and the substructure.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Figure 1:
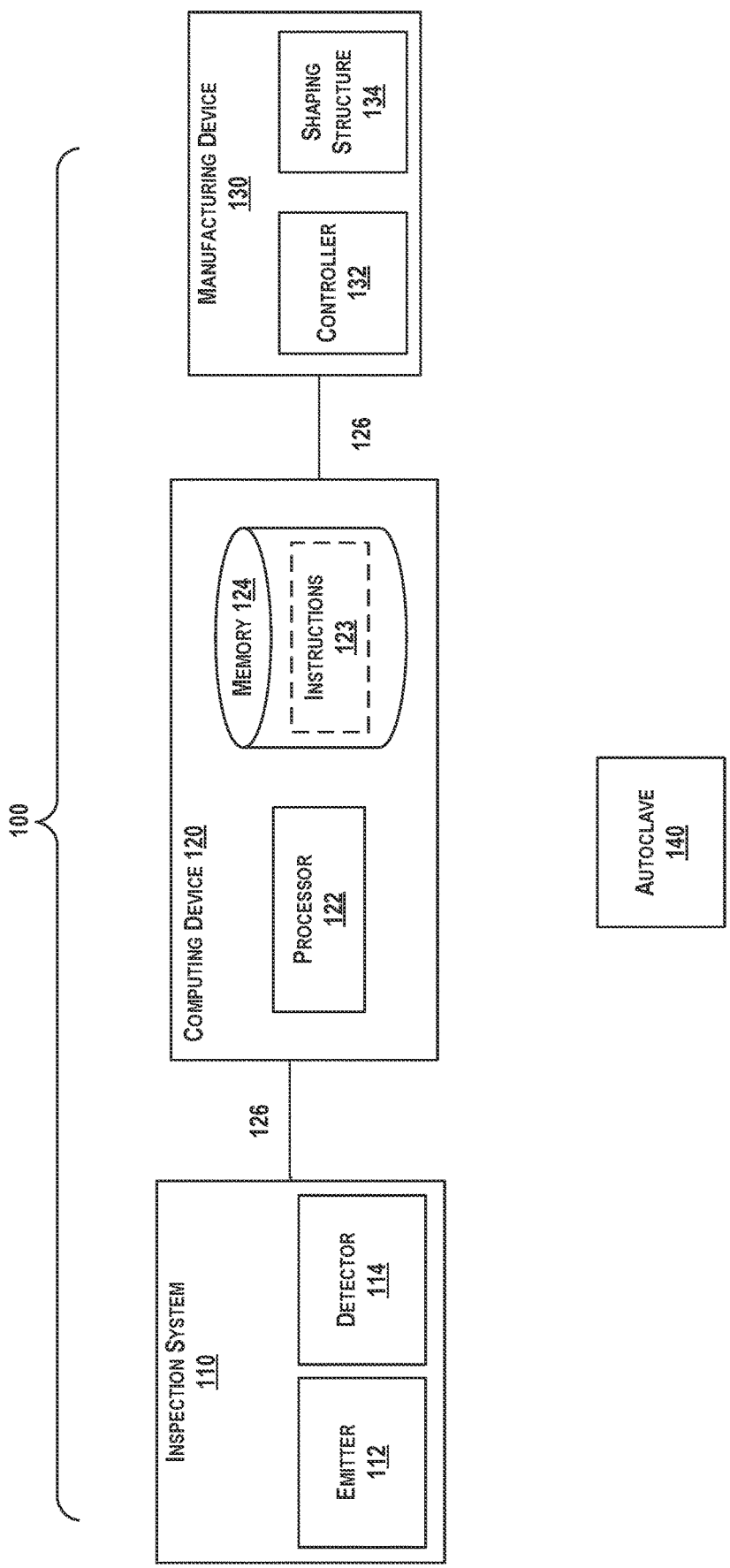
FIG. 1 illustrates a system for manufacturing a shim and assembling a shimmed assembly, according to an example implementation.

Disclosed examples will now be described more fully hereinafter with reference to the accompanying drawings, in which some, but not all of the disclosed examples are shown.

Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein are methods and systems for assembling an assembly including at least one composite substructure, a filler or shim, and a support structure, particularly where the filler or shim is manufactured using data generated from a nondestructive inspection of the composite substructure.

The disclosed systems and methods can be used in various contexts, such as in aircrafts or other vehicles, or in environments other than vehicles. While the examples included herein are described in the context of assembling the skin and support structures of an aircraft, it is understood that the methods and systems could be used in other applications using a composite substructure.

The disclosed methods and systems include performing a nondestructive inspection of an uncured composite substructure using a scanning inspection system to generate data representing a surface of the uncured composite substructure. The data is then used to manufacture a filler or shim having a surface shaped to mate to the scanned surface of the uncured composite substructure. Manufacturing the shim or filler based on the scan data reduces the time required for assembly compared to prior applications using an iterative shimming process. The shim or filler is coupled to the uncured composite substructure to form a subassembly, and the subassembly is cured. Assembling the subassembly prior to curing the substructure reduces strain on the substructure, decreasing the likelihood of strength reduction thus enabling higher composite laminate quality and joint strength.

These and other improvements are described in more detail below. Implementations described below are for purposes of example. The implementations described below, as well as other implementations, may provide other improvements as well.

Referring now to the figures, FIG. 1 depicts an example of a system 100 for manufacturing a shim for use in mating a support structure to a substructure. The system 100 includes a scanning device or inspection system 110, a computing device 120, a shaping device or manufacturing device 130, and an autoclave 140.

The inspection system 110 is a nondestructive inspection system configured to inspect a mating surface of a substructure and generate a data set representing a shape of the mating surface. In some examples, the inspection system 110 is a scanning inspection system having an emitter 112 configured to emit a signal and a detector 114 configured to detect a reflected signal. Example scanning inspection systems include an ultrasonic wave scanning device, an eddy current scanning device, an x-ray device, a magnetic resonance device, an optical imaging device, or a microwave device. Accordingly, the emitter 112 is configured to admit an ultrasonic wave, an eddy current, an x-ray, a magnetic field, visible light, or microwaves.

In some examples, the computing device 120 takes the form of a client device (e.g., a computing device that is actively operated by a user), a server, cloud computing device, or some other type of computational platform. In some examples, the computing device 120 takes the form of a desktop computer, laptop computer, tablet computer, smartphone, wearable computing device (e.g., AR glasses), or other type of device. In some forms, the computing device 120 is in communication with inspection system 110 and/or the manufacturing device 130. As such, the computing device 120 receives information including the data set from the inspection system 110 and/or transmit information to the manufacturing device 130. For example, the computing device 120 transmits a control instruction to manufacturing device 130 to cause the manufacturing device 130 to manufacture the shim.

The processor 122 is a general-purpose processor or special purpose processor (e.g., a digital signal processor, application specific integrated circuit, etc.). The processor 122 is configured to execute the instructions 123 (e.g., computer-readable program instructions including computer executable code) that are stored in the memory 124 and are executable to provide various operations described herein. In alternative examples, the computing device 120 includes additional processors that are configured in the same manner. At least some of the operations described herein as being performed by the computing device 120 are performed by the processor 122.

The memory 124 takes the form of one or more computer-readable storage media that is read or accessed by the processor 122. In some examples, the computer-readable storage media includes volatile and/or non-volatile storage components, such as optical, magnetic, organic or other memory or disc storage, which can be integrated in whole or in part with the processor 122. The memory 124 is considered non-transitory computer readable media. In some examples, the memory 124 is implemented using a single physical device (e.g., one optical, magnetic, organic or other memory or disc storage unit), while in other examples, the memory 124 is implemented using two or more physical devices.

The communication link 126 takes the form of any wired connection (e.g., Ethernet) or wireless connection (e.g., Bluetooth®) over which the computing device 120 engages in communication with the inspection system 110 and/or the manufacturing device 130.

The computing device 120 is configured to receive the data set representing the shape of the mating surface of the substructure and generate model data representing a first surface of a shim based on the data set. In some examples, the computing device 120 is configured to generate model data representing the full shape of the shim.

In some examples, the computing device 120 is configured to predict a morphing of the substructure during curing. The computing system 120 generates the model data representing the first surface based on both the data set and the predicted morphing of the substructure such that the shim does not interfere with the morphing of the substructure.

The manufacturing device 130 is a computer numerical controlled manufacturing device configured to manufacture a shim based at least in part on the model data from the computing device 120. The manufacturing device 130 includes a controller 132 and a shaping structure 134. The controller 132 controls the shaping structure 134 to shape the shim. In some forms, the manufacturing device 130 manufactures the shim based indirectly on the model data. For example, the controller 132 of the manufacturing device, the computing device 120, or a second computing system converts the model data into data or machine readable instructions executable by the manufacturing device.

In some forms, the manufacturing device 130 includes an additive manufacturing device, such as a three dimensional ("3D") printer configured to print the shim or filler. Alternatively or additionally, the manufacturing device 130 includes a subtractive manufacturing device, such as a router, a grinder, a sander, or a cutter configured to remove material from the shim or filler.

The autoclave 140 is a device or machine capable of curing composite components. In some examples, the autoclave 140 is an autoclave or oven having a heated chamber into which the subassembly is inserted for curing. In some forms, the heated chamber is pressurized. However, other curing devices can be used, such as an electron beam curing device.

In operation, the system 100 is used to manufacture a shim for use in assembling an assembly including a composite substructure. A mating surface of the composite substructure is scanned by the inspection system 110. The inspection system 110 generates a data set representing a shape of the mating surface. The data set is input into the computing device 120. The computing device executes instructions stored in the memory 124 which cause the processor 122 to generate model data representing a shape of a first surface of a shim based at least in part on the data set. The model data is used by the manufacturing device 130 to manufacture a shim having a first surface shaped based on the model data. The first surface of the shim is mounted to the mating surface of the substructure to form a subassembly. The subassembly is then cured by the autoclave 140.

Figure 2A:
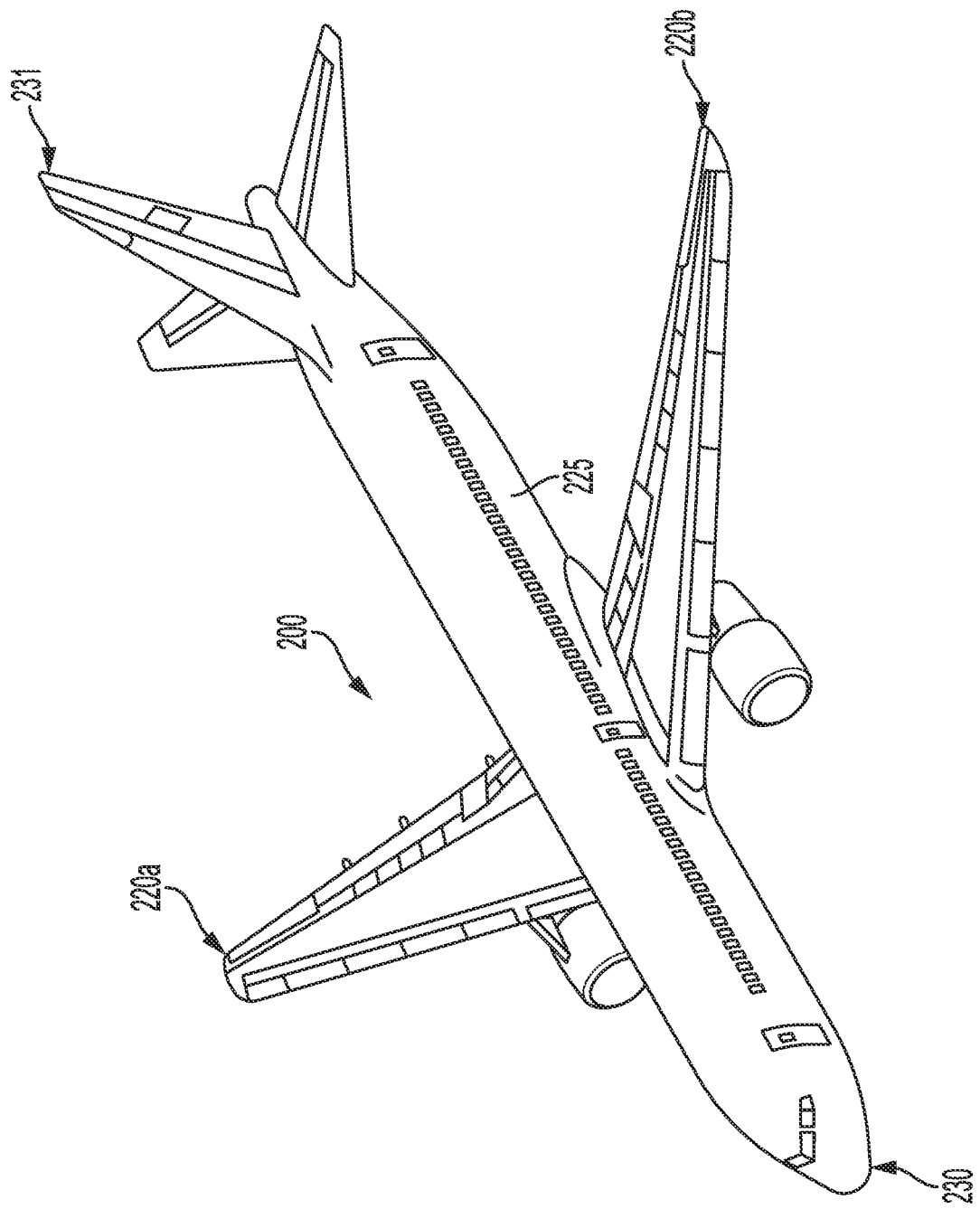
FIG. 2A depicts an aircraft, according to an example implementation.

In some example applications, the system 100 is used to assemble the skin of an aircraft to support structure. FIG. 2A is a perspective view of an aircraft 200, according to an example implementation. The aircraft 200 includes a nose 230, wings 220a-b, a fuselage 225, and a tail 231, according to an example implementation. The aircraft 200 includes many areas arranged for storage of items during flight. In one example, the fuselage 225 includes storage underneath a passenger compartment for storing luggage and other items or supplies. In another example, the passenger compartment in the fuselage 225 includes overhead bins and under seat areas for storing further items. The nose 230, wings 220a-b, fuselage 225, and tail 231 include an exterior skin 202 supported by internal support structures, such as frames or ribs.

Figure 2B:
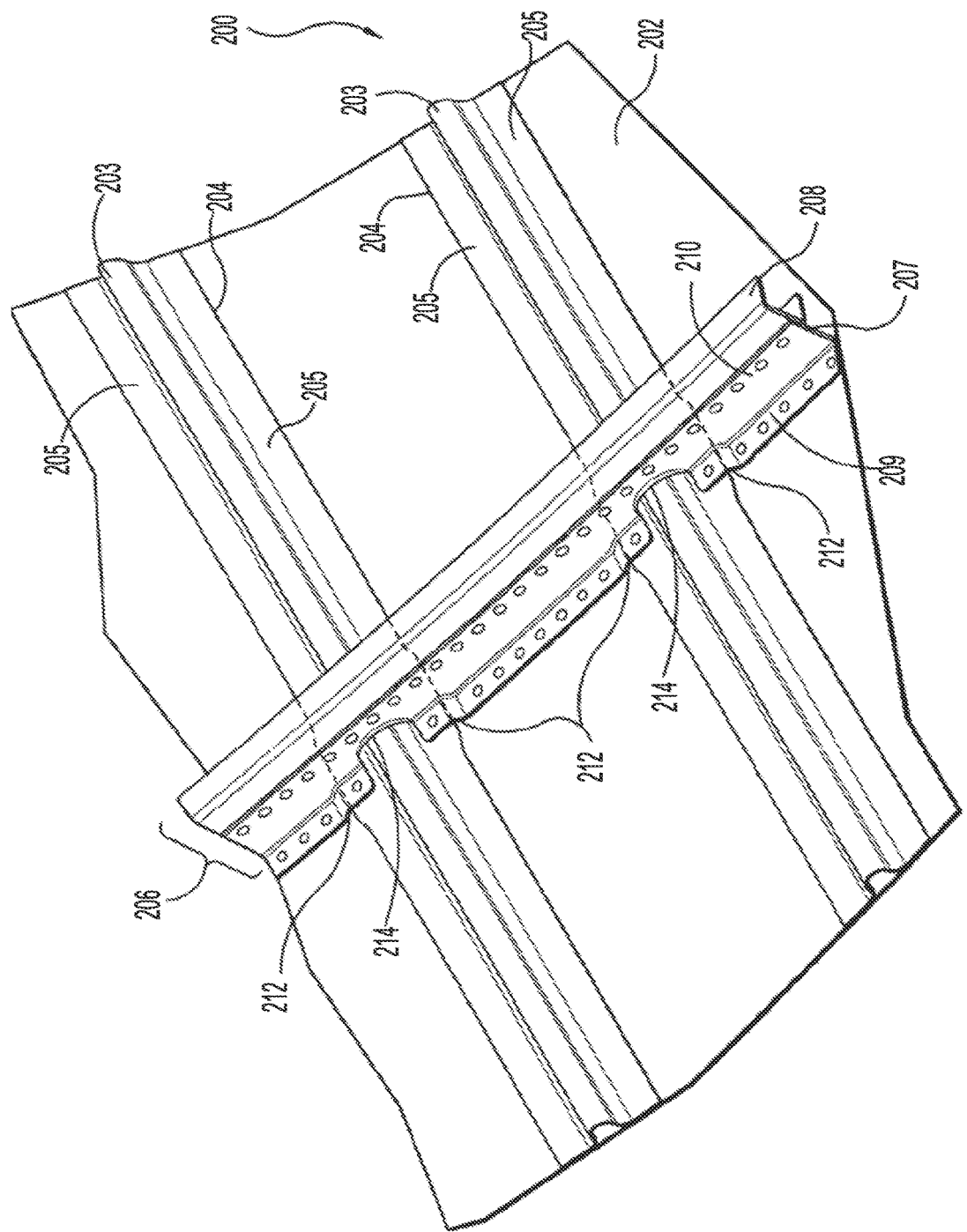
FIG. 2B depicts a composite aircraft skin panel of the aircraft of FIG. 2A coupled to a support structure, according to an example implementation.

FIG. 2B illustrates a portion of the interior of the aircraft 200. The aircraft 200 includes a support structure 206 and a plurality of stringers 204 attached to the skin 202. The stringers 204 are "hat-section" stringers having a raised portion 203 and opposing flange portions 205. The flange portions 205 are attached directly to the skin 202.

The skin 202 includes a composite material having a fiber component and a resin component such as carbon fiber or fiber glass. In some forms, the skin 202 is formed of multiple layers of composite material forming a laminate.

The support structure 206 includes a first section 207 and a second section 208. The first section 207 includes a base portion 209 and an upstanding leg portion 210. The upstanding leg portion 210 is fastened to the second section 208, and includes a plurality of openings 214 through which the raised portions 203 of the stringers 204 extend. The base portion 209 is attached to the stringer flange portions 205 and the skin 202. The base portion 209 includes a plurality of steps or joggles 212 positioned outboard of the stringer flange portions 205. The joggles 212 allow the base portion 209 to step off of the stringer flange portions 205 and onto the skin 202. One or more fillers or shims (not shown) are positioned between the support structure 206 and the skin 202 to reduce gaps therebetween. As described herein, the shim or filler is manufactured based on scan data of a mating surface of the skin 202 and coupled to the skin 202 prior to curing.

Figure 3:
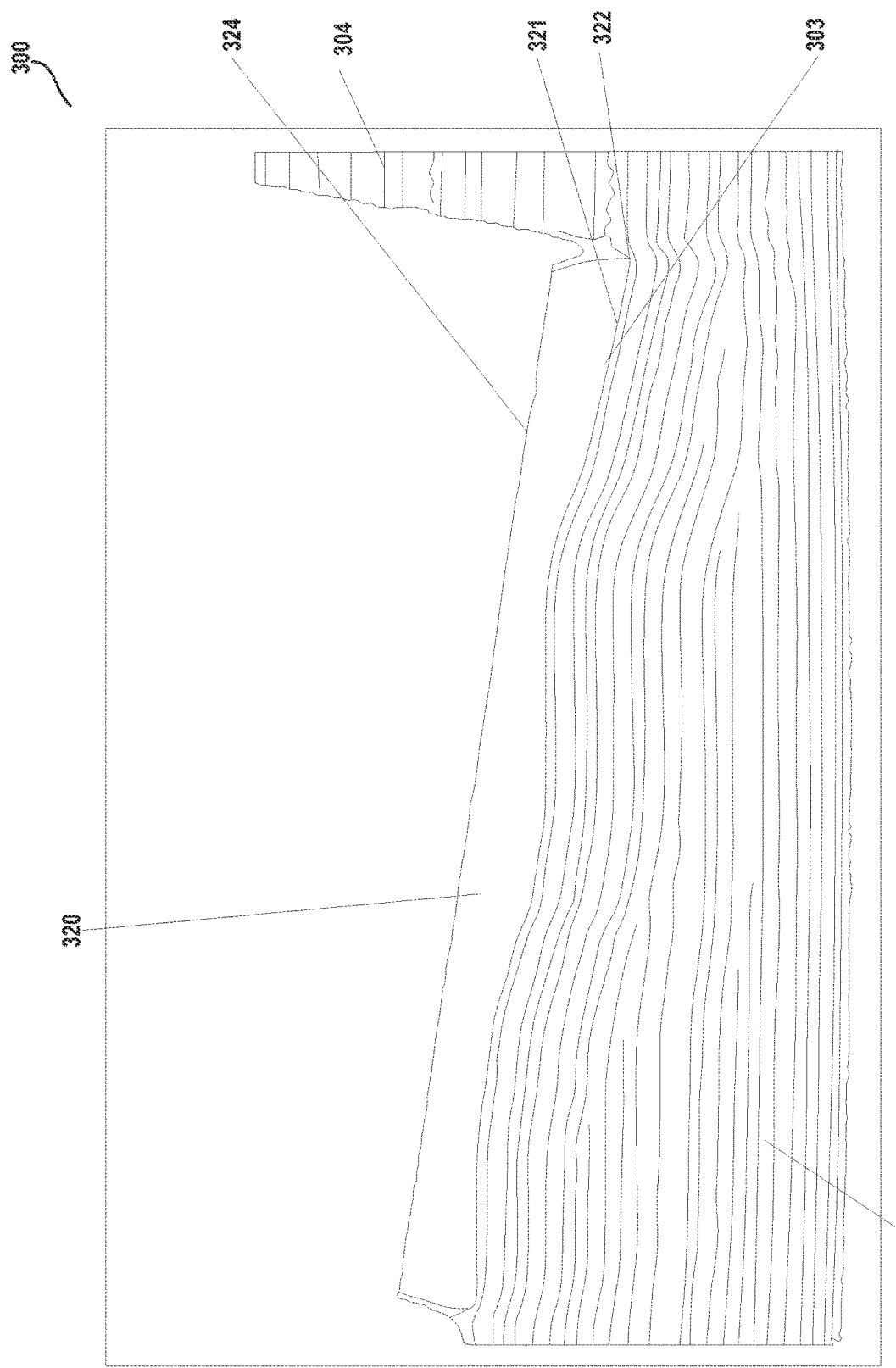
FIG. 3 shows a shimmed subassembly, according to an example implementation.

FIG. 3 is a cross-section of a subassembly 300 including a composite substructure 302, a filler or shim 320, and a stringer 304. In some examples, the substructure 302 and the stringer 304 are the skin 202 and stringer 204, respectively, of the aircraft 200. The composite substructure 302 includes a mating surface 303. The shim 320 has a corresponding first surface 321 which is coupled to the mating surface 303. As shown, the first surface 321 substantially follows the shape of the mating surface 303 such that only small gaps exist there between. In some forms, an adhesive 322 is applied between the first surface 321 and the mating surface 303 to couple the shim 320 to the composite substructure 302. Alternatively or additionally, the shim 320 is secured to the composite substructure 302 by the resin of the substructure 302.

In operation, the shim 320 is formed based at least in part on a data set representing the shape of the mating surface 303. The first surface 321 is shaped such that when assembled, the gaps between the shim 320 and the composite substructure 302 do not exceed a predetermined gap allowance threshold value which is retrieved from computer readable memory. In some forms, a computing system predicts a morphing of the shape of the composite substructure 302 during curing. The first surface 321 is shaped such that after assembly, the composite substructure 302 is allowed to morph as predicted.

The shim 320 is coupled to the composite substructure 302 prior to curing. The subassembly 300 is then cured using an autoclave or other curing device. In some forms, the shim 320 is cured prior to assembly. Alternatively, the shim 320 is uncured when assembled and is cured along with the composite substructure 302.

The shim 320 further includes a second surface 324 substantially opposite the first surface 321. The second surface 324 is configured to couple to a support structure, such as a frame or rib. The second surface 324 is shaped to correspond to the shape of an inner surface of the support structure. In some forms, the second surface 324 is substantially flat so as to mate to a substantially flat inner surface of the support structure. In alternative embodiments, the second surface has a varying height, similar to the first surface 321, which is formed based on scan data of the support structure.

Figure 4:
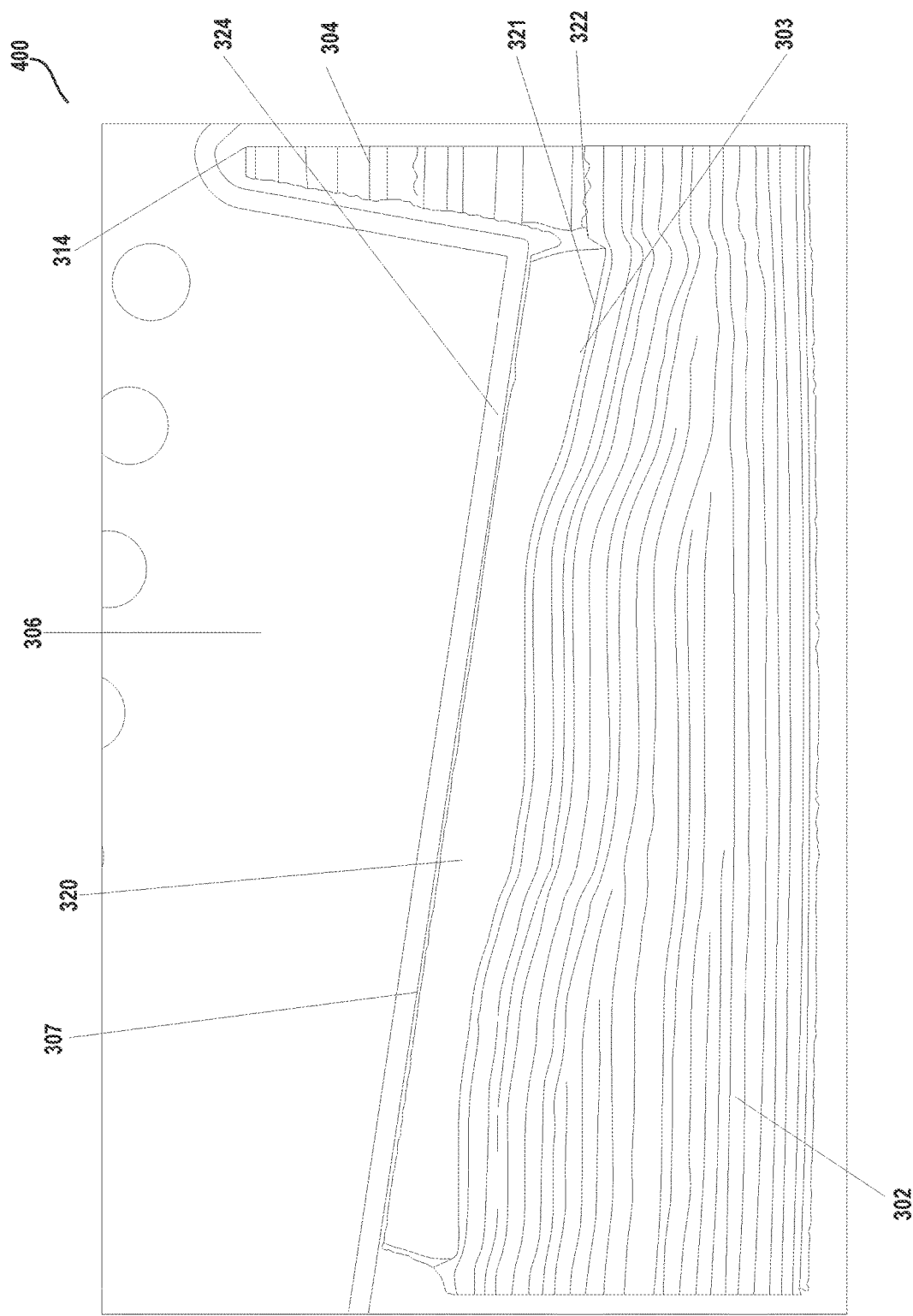
FIG. 4 shows a shimmed assembly, according to an example implementation.

FIG. 4 is a cross-sectional view of an assembly 400 including the subassembly 300 of FIG. 3 and a support structure 306. In some examples, the support structure 306 is the support structure 206 of the aircraft 200 described above. The support structure 306 includes an opening 314 through which the stringer 304 extends. The support structure 306 further includes an inner surface 307 facing toward the composite substructure 302. The inner surface 307 is coupled to the shim 320.

In some examples, the composite substructure 302 is the composite skin of an aircraft. The support structure 306 is a frame of the aircraft to which the skin is mounted. In some forms, the assembly 400 is part of the wing of the aircraft. The support structure 306 is rib structure.

Figure 5:
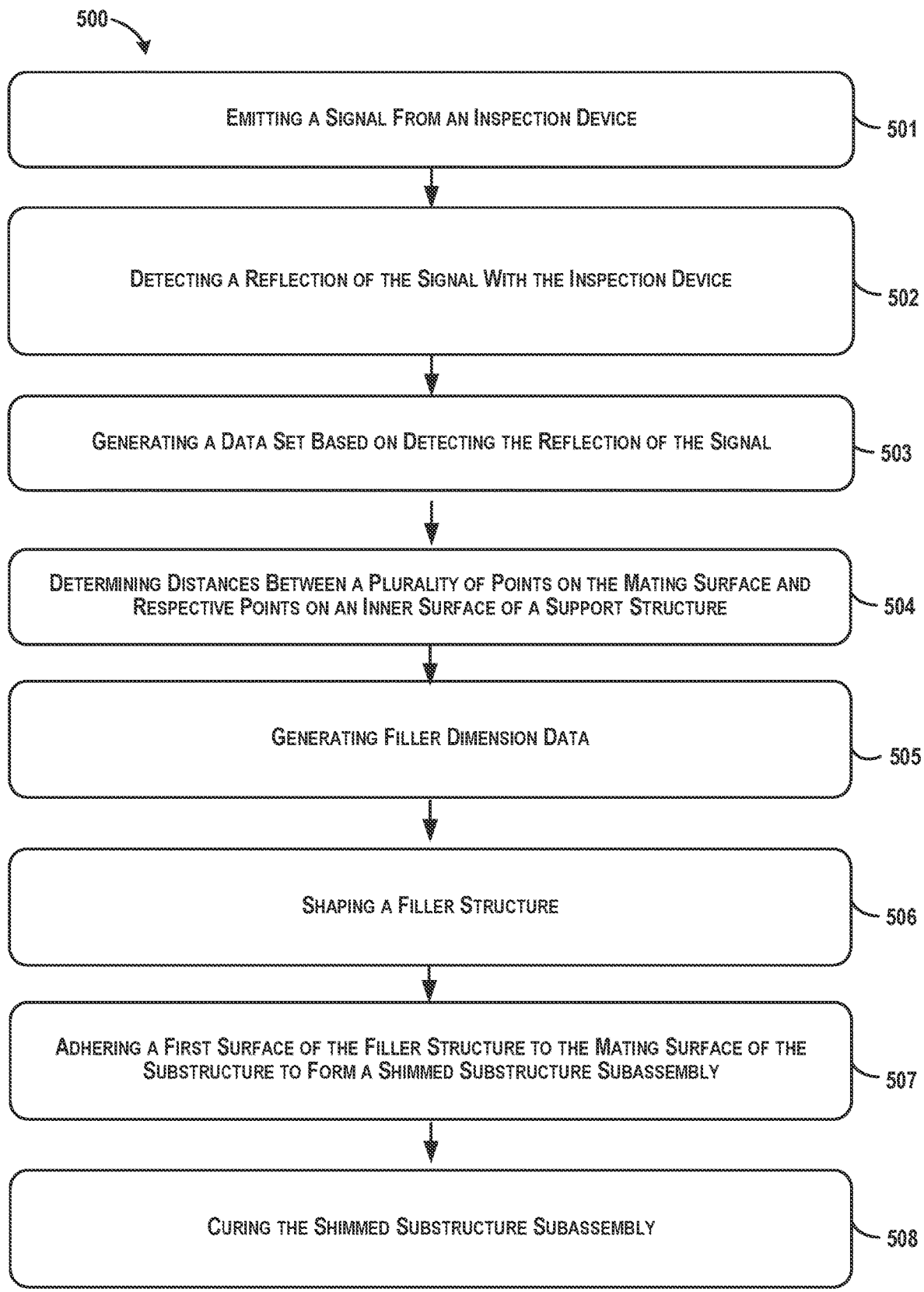
FIG. 5 is a flowchart illustrating a method of shimming an uncured substructure for assembly, according to an example implementation.

FIG. 5 shows a flowchart of an example of a method 500 that could be used with the system 100 shown in FIG. 1 to form at least part of the assembly 400 of FIG. 4. Method 500 includes one or more operations, functions, or actions as illustrated by one or more of blocks 501-508.

At block 501, the method 500 includes emitting a signal from an inspection system proximate a mating surface of a substructure. The inspection system is a nondestructive inspection system having an emitter and a detector, such as the inspection system 110 described above. In some examples, the signal is emitted directly at the mating surface of the substructure such that the signal is at least partially reflected by the mating surface. In other examples, the signal is emitted along the mating surface such that the substructure blocks part of the signal, and the unblocked portion of the signal illustrates a silhouette of the substructure.

At block 502, the method 500 includes detecting a reflection of the signal with the inspection system. Detecting the reflection of the signal includes inspecting portions of the signal reflected off of multiple respective points along the mating surface of the substructure.

At block 503, the method 500 includes generating a data set based on detecting the reflection of the signal, the data set representing a shape of the mating surface. In some forms, the data set includes a topographical surface map or surface texture gradient of the mating surface of the substructure. In some examples, block 503 further includes predicting a morphing of the substructure during curing. The data set is adjusted based on the predicted morphing to represent a shape of the mating surface after curing.

At block 504, the method 500 includes determining distances between a plurality of points on the mating surface and respective points on an inner surface of a support structure based on the data set. The number and location of points on the mating surface is determined by the resolution of the inspection system. A same number of respective points are selected on the inner surface such that all lines connecting the plurality of points to the respective points are parallel. In some examples, the inner surface is substantially flat. Accordingly, the distances are determined based on the assumption that the inner surface is perfectly flat. The respective points are spaced from the plurality of points in a direction normal to the inner surface.

In other examples, the distances are determined using the data set representing the shape of the mating surface and a second data set representing the predicted shape of the inner surface. In one form, the second data set is produced by a nondestructive inspection or scan of the inner surface having the same resolution as the scan of the mating surface.

At block 505, the method 500 includes generating filler dimension data based on the distances. Because the mating surface of the substructure is not flat, the height of the thickness of the filler will vary along the corresponding first surface to mirror the change in height of the mating surface. Accordingly, the filler dimension data includes a varying thickness. As discussed above, in some examples the computing device has a second data set representing a shape of the inner surface of the support structure. Accordingly, the filler dimension data includes modeling a second surface of the filler or shim based on the second data set.

The filler dimension data is data representing the shape of a custom filler or shim for assembly between the substructure and the support structure. In some examples, the filler dimension data includes data representing the full three dimensional shape of the filler or shim. Alternatively, the filler dimension data includes data representing a portion of the filler or shim proximate the substructure in assembly, the portion including a first surface configured to mate to the mating surface.

At block 506, the method 500 includes shaping a filler structure with a computer numerical controlled shaping device using the filler dimension data. As discussed above, the shaping device includes a subtractive manufacturing device and/or an additive manufacturing device. In some forms, the shaping device receives the filler dimension data directly from a computing device that generated the filler dimension data.

At block 507, the method 500 includes adhering a first surface of the filler structure to the mating surface of the substructure to form a shimmed substructure subassembly. In some examples, the first surface is adhered to the mating surface by an adhesive material. Alternatively, the first surface is adhered to the mating surface by the uncured resin of the substructure. In some examples, block 507 includes aligning the filler structure relative to the mating surface based on the predicted morphing of the substructure such that the filler structure does not interfere with the predicted morphing. Improper alignment can result in damage to the substructure, such as wrinkling.

At block 508, the method 500 includes curing the shimmed substructure subassembly. Curing the subassembly is performed by a curing device, such as an autoclave or oven.

Figure 6:
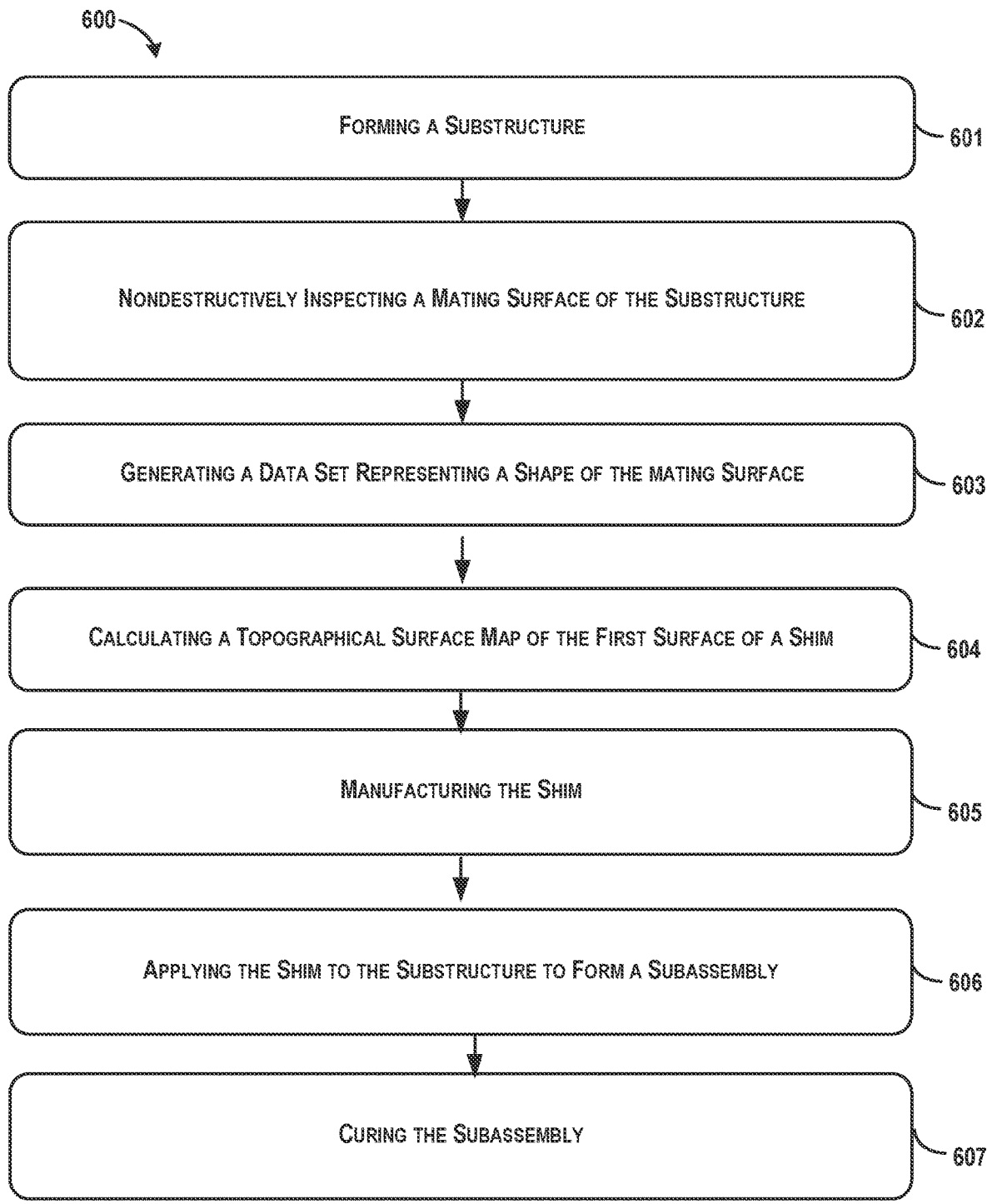
FIG. 6 is a flowchart illustrating a method of manufacturing and mounting a shim, according to an example implementation.

FIG. 6 shows a flowchart of an example of a method 600 that could be used with the system 100 shown in FIG. 1 to manufacture a shim and mount in in the subassembly 300 of FIG. 3. Method 600 includes one or more operations, functions, or actions as illustrated by one or more of blocks 601-607.

At block 601, the method 600 includes forming a substructure at least partially composed of an uncured resin material. The substructure is formed of a composite material including both the uncured resin material and a fiber material. In some examples, the substructure is a laminate formed of multiple layers of the composite material.

At block 602, the method 600 includes nondestructively inspecting a mating surface of the substructure using a scanning device. Inspecting comprises emitting a signal from an inspection system proximate a mating surface of a substructure and detecting a reflection of the signal. The inspection system is a nondestructive inspection system having an emitter and a detector, such as the inspection system 110 described above. In some examples, the signal is emitted directly at the mating surface of the substructure such that the signal is at least partially reflected by the mating surface. In other examples, the signal is emitted along the mating surface such that the substructure blocks part of the signal, and the unblocked portion of the signal illustrates a silhouette of the substructure.

At block 603, the method 600 includes generating with the scanning device a data set based on detecting the reflection of the signal, the data set representing a shape of the mating surface. In some examples, the scanning device determines the distance to a plurality of points on the mating surface from the scanning device based on the amount of time between emitting and detecting the signal. From this distance data, the scanning device, or a computing device, the data set which includes a topographical surface map or surface texture gradient of the mating surface of the substructure. In some examples, block 603 further includes predicting a morphing of the substructure during curing. The data set is modified based on the predicted morphing such that it represents the predicted shape of the mating surface.

At block 604, the method 600 includes calculating a topographical surface map of a first surface of the shim based on the data set. The topographical surface map is a three dimensional representation of the first surface of the shim illustrating changes in height of the surface (e.g., the locations and heights of peaks and valleys on the first surface). In some examples, a full three dimensional model of the shim, including the topographical surface map, is generated. In some forms, the three dimensional model further includes a second topographical surface map of a second surface of the shim, wherein the second surface is substantially opposite the first surface.

Calculating the topographical surface map includes first starting with the data set as the first surface is shaped to substantially follow the shape of the mating surface. In some examples, the computing device performing the calculation smooths one or more of the height transitions based on prestored parameters. Prestored parameters include the capabilities of the manufacturing device used to manufacture the shim, gap tolerances, and the material being used to form the shim. The smoothed topographical surface map is compare to the data set to determine if the first surface intersects the mating surface. The comparison further includes retrieving a predetermined gap allowance threshold from memory, and determining if there are any gaps between the first surface and the mating surface which exceed the threshold. In some forms, the smoothing is a recursive process in which the topographical surface map is revised until the comparison shows that there are no intersections or gaps exceeding the threshold.

At block 605, the method 600 includes manufacturing the shim with a computer numerical controlled manufacturing, wherein the shim has a first surface shaped based on the topographical surface map. As discussed above, the manufacturing device includes a subtractive manufacturing device and/or an additive manufacturing device. In one example, manufacturing the shim includes the additive manufacturing technique of 3D printing the shim and then the subtractive manufacturing technique of selectively removing material from the first surface with a subtractive manufacturing device based on the topographical surface map to conform to the shape of the mating surface. In some examples, manufacturing the shim includes curing the shim. In other examples, the shim is in an uncured state when applied to the substructure in block 606.

At block 606, the method 600 includes applying the shim to the substructure such that the first surface engages the mating surface to form a subassembly. In some examples, and adhesive is applied to the first surface and/or the mating surface to secure the shim to the substructure. Alternatively or additionally, other fasteners are used. In some examples, applying the shim to the substructure includes aligning the shim relative to the substructure based on the predicted morphing of the substructure such that the shim does not interfere with the predicted morphing.

At block 607, the method 600 includes curing the subassembly. Curing the subassembly is performed by a curing device, such as an autoclave or oven.

In some examples, devices or systems are used or configured to perform logical functions presented in FIGS. 5 and 6. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Although blocks in FIGS. 5 and 6, are illustrated in a sequential order, in other examples these blocks are be performed in parallel, and/or in a different order than those described herein. Also, in some examples, the various blocks are combined into fewer blocks, divided into additional blocks, and/or removed based upon the desired implementation.

It should be understood that for these and other processes and methods disclosed herein, flowcharts show functionality and operation of one possible implementation of present examples. In this regard, one or more of the blocks, or portions of the blocks represent a module, a segment, or a portion of program code, which includes one or more instructions executable by a processor for implementing specific logical functions or steps in the process. The program code is stored on any type of computer readable medium or data storage, for example, such as a storage device including a disk or hard drive. Further, in some examples, the program code is encoded on a computer-readable storage media in a machine-readable format, or on other non-transitory media or articles of manufacture. In some forms, the computer readable medium includes non-transitory computer readable medium or memory, for example, such as computer-readable media that stores data for short periods of time like register memory, processor cache and Random Access Memory (RAM). Alternatively or additionally, the computer readable medium includes non-transitory media, such as secondary or persistent long term storage, like read only memory (ROM), optical or magnetic disks, compact-disc read only memory (CD-ROM), for example. In other forms, the computer readable media is any other volatile or non-volatile storage systems. The computer readable medium is a tangible computer readable storage medium, for example.

In some examples, each block or portions of each block in FIGS. 5 and 6 represent circuitry that is wired to perform the specific logical functions in the process. Alternative implementations are included within the scope of the examples of the present disclosure in which functions are executed out of order from that shown or discussed, including substantially concurrent or in reverse order, depending on the functionality involved, as would be understood by those reasonably skilled in the art.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of shimming an uncured substructure for assembly, the method comprising:

emitting a signal from an inspection system proximate a mating surface of the substructure;
detecting a reflection of the signal with the inspection system;
generating a data set based on detecting the reflection of the signal, the data set representing a shape of the mating surface;
determining distances between a plurality of points on the mating surface and respective points on an inner surface of a support structure based on the data set;
predicting a morph of the shape of the mating surface of the substructure that will occur during curing;
adjusting, based on the predicted morph of the shape of the mating surface, the distances between the plurality of points on the mating surface and respective points on the inner surface of the support structure;
calculating, based on the adjusted distances between the plurality of points on the mating surface and respective points of an inner surface, a first topographical surface map representing the mating surface and a second topographical surface map representing the inner surface of the support structure;
performing, based on manufacturing capabilities, predefined gap tolerances, and materials of the substructure and the support structure, a first smoothing process on heights represented by the first topographical surface map and a second smoothing process on heights represented by the second topographical surface map;
generating filler dimension data using the first topographical surface map and the second topographical map after performing the first smoothing process and the second smoothing process, wherein the filler dimension data includes a varying thickness;
shaping a filler structure with a computer numerical controlled shaping device using the filler dimension data;
adhering a first surface of the filler structure to the mating surface of the substructure to form a shimmed substructure subassembly; and
curing the shimmed substructure subassembly.

2. The method of claim 1, wherein emitting the signal comprises emitting an ultrasonic wave, an eddy current, an x-ray, a magnetic field, visible light, a microwave, or a combination thereof.

3. The method of claim 1, wherein shaping the filler structure comprises use of an additive manufacturing technique to print the filler structure.

4. The method of claim 1, wherein shaping the filler structure comprises removing material from the first surface of the filler structure to conform to the shape of the mating surface of the substructure.

5. The method of claim 1, further comprising:
generating a second data set based on a predicted shape of the inner surface of the support structure that will occur during curing,
wherein adjusting the distances between the plurality of points on the mating surface and respective points on the inner surface of the support structure is additionally based on the second data set.

6. The method of claim 1, further comprising:
generating a second data set based on nondestructive inspection of the inner surface of the support structure using a nondestructive inspection system,
wherein determining the distances is additionally based on the second data set.

7. The method of claim 1, wherein shaping the filler structure comprises shaping the first surface of the filler structure based on the data set and shaping a second surface of the filler structure based on a second data set representing a shape of the inner surface of the support structure.

8. The method of claim 1, wherein the substructure is a frame of an aircraft and the support structure is a skin, and wherein the skin is a composite material having a fiber component and a resin component.

9. The method of claim 1, wherein curing the shimmed substructure subassembly comprises:
curing the shimmed substructure subassembly using an autoclave or oven.

10. A method of manufacturing and mounting a shim, the method comprising:
forming a substructure at least partially composed of an uncured resin material;
nondestructively inspecting a mating surface of the substructure using a scanning device;
generating with the scanning device a data set representing a shape of the mating surface;
predicting a morph of the shape of the mating surface of the substructure that will occur during curing;
modifying, based on the predicted morph of the shape of the mating surface, the data set representing the shape of the mating surface;
calculating a topographical surface map of the mating surface first surface of the shim based on the modified data set;
performing, based on manufacturing capabilities, predefined gap tolerances, and a material of the shim, a smoothing process on heights represented by the topographical surface map;
manufacturing the shim with a computer numerical controlled manufacturing device, the shim having a first surface shaped based on the topographical surface map after performing the smoothing process;
applying the shim to the substructure such that the first surface engages the mating surface to form a subassembly; and
curing the subassembly.

11. The method of claim 10, wherein the first surface is shaped based on the predicted morph of the shape of the mating surface of the substructure such that the shim does not interfere with the predicted morphing.

12. The method of claim 10, wherein applying the shim to the substructure includes aligning the shim relative to the substructure based on the predicted morph of the shape of the mating surface of the substructure.

13. The method of claim 10, further comprising generating a three dimensional ("3D") model of the shim,
wherein the 3D model includes the topographical surface map, and
wherein generating the 3D model of the shim further includes modeling a second surface of the shim based on a predicted shape of a support structure after curing.

14. The method of claim 10, further comprising adhering a support structure to a second surface of the shim, wherein the second surface is substantially opposite the first surface.

15. The method of claim 10, further comprising retrieving a predetermined gap allowance threshold from a computer readable memory, wherein the topographical surface map is shaped to mate to the mating surface without any gaps exceeding the predetermined gap allowance threshold.

16. The method of claim 10, further comprising curing the shim prior to adhering the first surface of the shim to the mating surface of the substructure.

17. The method of claim 10, wherein nondestructively inspecting the mating surface of the substructure using the scanning device comprises:
- emitting a signal from an inspection system proximate the mating surface of the substructure; and
- detecting a reflection of the signal using the inspection system.

18. The method of claim 17, wherein emitting the signal from the inspection system comprises:
- emitting an ultrasonic wave, an eddy current, an x-ray, a magnetic field, visible light, a microwave, or a combination thereof.

19. The method of claim 10, wherein applying the shim to the substructure comprises:
- applying adhesive to the first surface or the mating surface to secure the shim to the substructure.

20. The method of claim 10, wherein curing the subassembly comprises:
- curing the shimmed substructure subassembly using an autoclave or oven.

* * * * *